United States Patent
Russell et al.

(10) Patent No.: US 11,988,072 B1
(45) Date of Patent: *May 21, 2024

(54) PROJECTILE DRILLING SYSTEM

(71) Applicant: HYPERSCIENCES, INC., Spokane, WA (US)

(72) Inventors: Mark C. Russell, Spokane, WA (US); Lance D. Underwood, Cypress, TX (US); Tristen Cutshall, Spokane, WA (US)

(73) Assignee: HYPERSCIENCES, INC., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,728

(22) Filed: Feb. 22, 2023

Related U.S. Application Data

(63) Continuation of application No. 17/445,168, filed on Aug. 16, 2021, now Pat. No. 11,624,235.

(60) Provisional application No. 63/069,644, filed on Aug. 24, 2020.

(51) Int. Cl.
| | | |
|---|---|---|
| *E21B 4/14* | (2006.01) | |
| *E21B 7/00* | (2006.01) | |
| *E21B 7/18* | (2006.01) | |
| *E21B 10/38* | (2006.01) | |
| *E21D 9/00* | (2006.01) | |
| *E21D 9/10* | (2006.01) | |
| *E21D 9/12* | (2006.01) | |

(52) U.S. Cl.
CPC ................ *E21B 4/14* (2013.01); *E21B 7/005* (2013.01); *E21B 7/18* (2013.01); *E21B 10/38* (2013.01); *E21D 9/003* (2013.01); *E21D 9/006* (2013.01); *E21D 9/108* (2013.01); *E21D 9/128* (2013.01)

(58) Field of Classification Search
CPC . E21B 7/005; E21B 7/18; E21B 7/007; E21B 4/14; E21B 10/38; E21D 9/003; E21D 9/006; E21D 9/108; E21D 9/128
See application file for complete search history.

(56) References Cited

U.S. PATENT DOCUMENTS

| | | | | |
|---|---|---|---|---|
| 10,557,308 | B2* | 2/2020 | Russell | ............... E21B 7/16 |
| 11,624,235 | B2* | 4/2023 | Russell | ............... E21D 9/128 |
| | | | | 175/296 |
| 2010/0032206 | A1* | 2/2010 | Becker | ............... E21B 7/007 |
| | | | | 175/4.5 |
| 2017/0138128 | A1* | 5/2017 | Russell | ............... E21B 7/007 |

* cited by examiner

*Primary Examiner* — Yong-Suk (Philip) Ro
(74) *Attorney, Agent, or Firm* — Lindauer Law, PLLC

(57) ABSTRACT

Systems for drilling or tunneling include an assembly for accelerating a projectile through a first conduit into a region of geologic material, which generates debris. The debris may be reduced in size by moving the debris to a crushing device located in a second conduit using a conveying device, such as an auger. The reduced-size debris is then moved toward the surface using fluid movement. A third conduit may be used to provide and remove material from the bottom of the first conduit to control pressure at the end of the conduit to prevent ingress of material into the first conduit. Water jets or other types of devices may be used to cut or deform a perimeter of a region of geologic material before the projectile is accelerated to control the shape of the borehole and the manner in which debris is broken from the geologic material.

20 Claims, 11 Drawing Sheets

TIME = T4: PROPELLANT MATERIAL(S) ARE PROVIDED INTO BREECH TUBE

TIME = T6: BREECH TUBE IS ISOLATED AND PROPELLANT MATERIAL IS IGNITED TO ACCELERATE PROJECTILE THROUGH LAUNCH TUBE

TIME = T7: DEBRIS IS CRUSHED WITH DRILL BIT OR OTHER CRUSHING DEVICE, AIR OR OTHER FLUID(S) ARE USED TO FLUSH DEBRIS AND COOL THE SYSTEM, SUBSEQUENT PROJECTILE IS PREPARED FOR INSERTION

PROJECTILE DRILLING SYSTEM

PRIORITY

This application is a continuation of, and claims priority to, U.S. patent application Ser. No. 17/445,168, filed on Aug. 16, 2021, entitled "Ram Accelerator Augmented Drilling System", which is hereby incorporated by reference in its entirety.

U.S. patent application Ser. No. 17/445,168, claims priority to the United States provisional application for patent having the application Ser. No. 63/069,644, filed Aug. 24, 2020, titled "Ram Accelerator Augmented Drilling System". U.S. patent application 63/069,644 is incorporated by reference herein in its entirety.

INCORPORATION BY REFERENCE

The following United States patents and patent applications are incorporated by reference for all that they contain:

U.S. patent application Ser. No. 13/841,236, now U.S. Pat. No. 9,500,419, filed on Mar. 15, 2013, titled "Ram Accelerator System".

U.S. patent application Ser. No. 14/708,932, now U.S. Pat. No. 9,458,670, filed on May 11, 2015, titled "Ram Accelerator System with Endcap".

U.S. patent application Ser. No. 15/246,414, filed on Aug. 24, 2016, now U.S. Pat. No. 10,344,534, titled "Ram Accelerator System with Endcap".

U.S. patent application Ser. No. 14/919,657, filed on Oct. 21, 2015, now U.S. Pat. No. 9,988,844, titled "Ram Accelerator System with Rail Tube".

U.S. patent application Ser. No. 15/135,452, filed on Apr. 21, 2016, now U.S. Pat. No. 10,697,242, titled "Ram Accelerator System with Baffles".

U.S. patent application Ser. No. 15/340,753, filed on Nov. 1, 2016, now U.S. Pat. No. 10,557,308, titled "Projectile Drilling System".

U.S. patent application Ser. No. 15/698,549, filed on Sep. 7, 2017, now U.S. Pat. No. 10,590,707, titled "Augmented Drilling System".

U.S. patent application Ser. No. 15/348,796, filed on Nov. 10, 2016, now U.S. Pat. No. 10,329,842, titled "System for Generating a Hole Using Projectiles".

U.S. patent application Ser. No. 15/871,824, filed on Jan. 15, 2018, now U.S. Pat. No. 10,914,168, titled "System for Acoustic Navigation of Boreholes".

U.S. patent application Ser. No. 17/096,435, filed Nov. 12, 2020, titled "Projectile Augmented Boring System".

BACKGROUND

Traditional drilling and excavation methods use drill bits to penetrate through rock, dirt, and other geologic material to form boreholes, such as for production of hydrocarbons, water wells, geothermal energy, and so forth. The efficiency of these methods may be limited depending on the type of geologic material through which a drill bit penetrates. For example, a drill bit may progress more slowly through rock than softer materials. These traditional methods require significant amounts of energy, water, and other materials to provide rotational force to drill bits, cool the drill bits during operation, stabilize the borehole, and remove cuttings and other materials produced during drilling operations. Traditional methods also cause wear on cutting surfaces and other components, requiring replacement, which can slow or halt drilling operations.

BRIEF DESCRIPTION OF FIGURES

The detailed description is set forth with reference to the accompanying figures.

Figure 1:
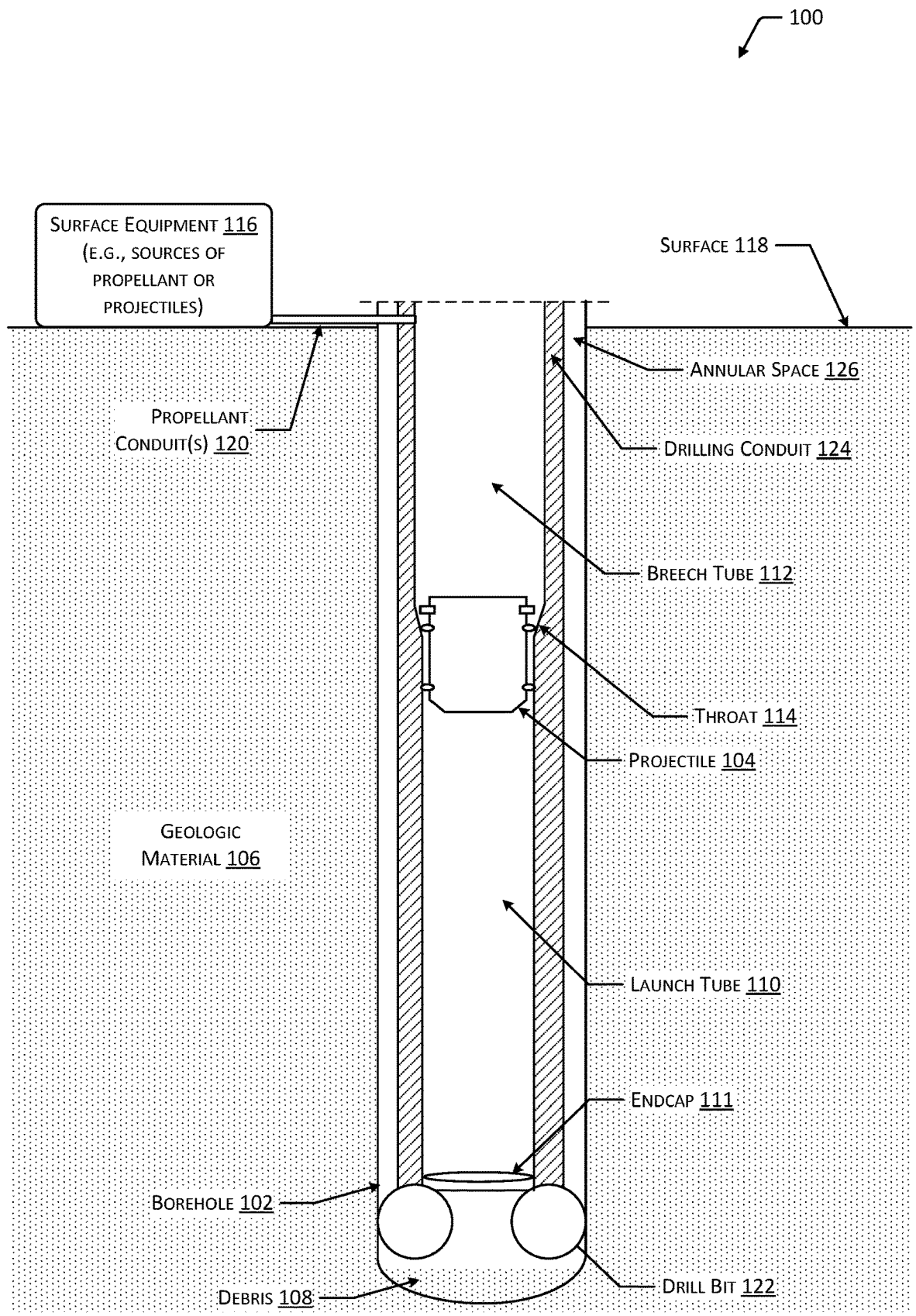
FIG. 1 depicts an implementation of a system for extending a borehole by accelerating one or more projectiles into a region of geologic material and removing debris formed by an interaction between the projectile(s) and the geologic material.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Boreholes may be formed in geologic material for production of hydrocarbons, water wells, geothermal energy, performance of mining operations, or other purposes. A borehole may be a generally vertical shaft, a generally horizontal shaft, or an angled shaft. In some cases, the direction of a borehole may be changed as the borehole is extended, such as through use of directional drilling techniques. Conventional operations for forming and extending a borehole use rotary drill bits to bore through earth, rock, or other geologic materials. Motive force is applied to the drill bit using motors or similar devices located at the surface, or within the borehole, to cause the drill bit to rotate and penetrate through geologic material, forming debris referred to as cuttings. Fluid from the surface, known as drilling mud, is flowed through drill pipe or another type of conduit into the borehole to cool and lubricate the drill bit. The drilling mud also washes the cuttings from the bottom of the borehole and carries the cuttings toward the surface, enabling drilling operations to continue. Conventional drilling operations typically require large quantities of energy, water, and materials. For example, cutting surfaces of drill bits, as well as other downhole and surface equipment, may be subject to wear and require repair or replacement, during which drilling operations may be slowed or halted. Additionally, large quantities of energy, water, and drilling mud may be necessary to apply rotative force to a drill bit, cool and lubricate the drill bit, and remove cuttings from a borehole. Further, the efficiency of drilling operations may be affected by various environmental conditions, such as the composition of geologic material. For example, drilling through resistant material such as hard rock may require greater amounts of energy and materials, cause greater wear to equipment, and extend a borehole at a slower rate than drilling through other materials.

Described in this disclosure are systems for extending a borehole within geologic material using interactions between projectiles and the geologic material. A projectile may be positioned within a launch tube or another type of conduit. An end of the launch tube may be oriented toward a region of the geologic material where it is desired to create or extend a borehole. One or more propellant materials may be provided into the launch tube or another conduit adjacent to the launch tube. Conduits between the launch tube and the surface may be used to transport projectiles, propellant material(s), or other materials from the surface to the launch tube. In some implementations, propellant material(s) may be generated within a borehole, such as by providing materials into the borehole or using materials that occur within the borehole and one or more devices within the borehole to perform electrolysis or another type of reaction or process to generate the propellant material(s). For example, electrolysis of water within the borehole may be used to form hydrogen and oxygen, which may be used as propellant materials. Propellant materials may include one or more combustible or detonatable materials that apply a force to a projectile when ignited, one or more pressurized materials such as compressed air, water, or other fluids that apply a force to the projectile based on the pressure of the material(s), and so forth. The force may accelerate the projectile out from the launch tube and into contact with a region of the geologic material. In other implementations, the projectile may be accelerated by applying an electromagnetic force in addition to or in place of use of propellant materials to apply a pressure to the projectile. The interaction between the projectile and the geologic material may extend a borehole. Conduits between the launch tube and the surface may also be used to control a pressure at the lower end of the borehole, such as by venting pressure or material from the borehole to the surface, or providing fluids or other materials into the launch tube or borehole to maintain a selected pressure.

In some implementations, the projectile may be formed having two portions, such as a front and rear portion, and the rear portion may be removable from (e.g., shearable or frangible from) the front portion. For example, the rear portion may have a diameter greater than that of the front portion to enable the projectile to be positioned within or at an end of the launch tube while the greater diameter of the rear portion prevents passage of the projectile before pressure is applied using the propellant material(s). The rear portion may include an O-ring or other type of sealing service that prevents passage of propellant material(s) or pressure from behind the projectile into the launch tube. The sealing member and rear portion of the projectile may enable pressure from the propellant material(s) to increase to a desired level before the rear portion is separated from the front portion, enabling the force from the propellant material(s) to accelerate the front portion of the projectile through the launch tube. In some implementations, the front portion of the projectile may include an O-ring or sealing device that removes material from the launch tube as the projectile is accelerated through the launch tube.

The interaction between the projectile and the geologic material may generate debris, such as by breaking portions of rock or other geologic material from the region contacted by the projectile. In some cases, the debris created by the interaction between the projectile and the geologic material may be fairly large, and removal of the debris from the borehole using drilling mud, air, water, or another type of fluid may be impractical. In such a case, a crushing device may be used to reduce a size of the debris. In some implementations, the crushing device may include a drill bit positioned at or near the end of the launch tube. Interactions between the drill bit and the debris may reduce the size of the debris. A fluid within the borehole may then be used to move the debris having the reduced size through a conduit away from the region of geologic material contacted by the projectile (e.g., toward the surface), such as by entraining the debris, forming a slurry, and so forth. In other implementations, the crushing device may include a gyratory crusher, a jaw-type crusher, or another type of crushing device which may be positioned away from the bottom of the borehole, such as within a conduit oriented toward the debris. A conveying device, such as an auger, may move debris away from the bottom of the borehole and toward the crushing device, which may reduce the size of the debris such that a fluid may move the debris having the reduced size toward the surface. For example, a conveying device may be positioned in a second conduit that is adjacent to, coaxial with, positioned within, or contains a first conduit through which the projectile is accelerated. In still other implementations, additional projectiles may be accelerated into contact with the debris to reduce the size of the debris in lieu of or in addition to use of a separate crushing device.

In some implementations, a pre-conditioning device or material may be used to contact at least a portion of the perimeter of the region of the geologic material where the projectile is accelerated. For example, a water jet, cutter, drill bit, or one or more initial projectile interactions may be used to pre-condition a region of geologic material by interacting with a perimeter of the region before a projectile is accelerated into contact with the region. The pre-conditioned perimeter may control the manner in which the borehole is extended, such as by controlling the manner in which shock waves propagate through the geologic material, which may be used to control the size and shape of the borehole, the formation of debris, and so forth.

In some implementations, sections of casing or another type of conduit may be inserted into a borehole as the borehole is extended using projectiles and as debris is removed from the borehole. For example, if debris is removed from the borehole using an auger and crushing device within a conduit, the annulus of the borehole may not necessarily be used for this purpose, and casing may be lowered into the annulus without interfering with the removal of debris from the borehole.

FIG. 1 depicts an implementation of a system 100 for extending a borehole 102 by accelerating one or more projectiles 104 into a region of geologic material 106 and removing debris 108 formed by an interaction between the projectile(s) 104 and the geologic material 106. Geologic material 106 may include earth, sand, aggregate, hard rock, porous or softer rock, or any other material within which a borehole 102 may be formed. For example, a borehole 102 formed in rock or other types of geologic material 106 may be used for production of hydrocarbons, water, geothermal energy, and so forth. While FIG. 1 depicts the borehole 102 as a generally vertical shaft, in other implementations, a borehole 102 may include a horizontal shaft, an angled shaft, or a shaft having an irregular (e.g., non-straight) shape, such as a shaft that includes curves, angles, and so forth.

To extend the borehole 102, one or more projectiles 104 may be accelerated through one or more conduits, such as a launch tube 110. The launch tube 110 may include a pipe or other type of conduit having a first end oriented toward a region of the geologic material 106, such as a distal end of the borehole 102, and a second end opposite the first end. In some implementations, the first end of the launch tube 110 that is oriented toward the geologic material 106 may include an open end. In other implementations, the first end of the launch tube 110 may be covered by one or more endcaps 111, or one or more valves or other types of separator mechanisms may seal at least a portion of the launch tube 110 from an environment within the borehole 102 external to the launch tube 110. For example, at least a portion of the launch tube 110 may be isolated from pressure within the environment of the borehole 102 external to the launch tube 110, and in some cases, the launch tube 110 may also be isolated from ingress of material, such as debris 108, fluids, and so forth. In some implementations, at least a portion of the launch tube 110 may be isolated from pressure or materials within the borehole 102 by controlling a pressure of the portion of the launch tube 110 or of the borehole 102. For example, one or more conduits may be used to vent pressure or other materials from a region of the borehole 102 proximate to the first end of the launch tube 110, or to provide materials into the launch tube 110 proximate to the first end, such that pressure in the launch tube 110 prevents ingress of pressure or materials from the region of the borehole 102 proximate to the first end of the launch tube 110. Techniques to control the pressure within the borehole 102 or launch tube 110 using conduits may be used in place of or in addition to use of endcaps 111, valves, or other closure or separation mechanisms that physically impede transmission of pressure or materials from the borehole 102 into the launch tube 110.

While the first end of the launch tube 110 is oriented toward the geologic material 106, FIG. 1 depicts a breech tube 112 positioned at the second end of the launch tube 110 opposite the first end to form a contiguous conduit. In some implementations, the launch tube 110 and breech tube 112 may include separate members, while in other implementations, the launch tube 110 and breech tube 112 may include a single member. The breech tube 112 may have a diameter larger than that of the launch tube 110, while the launch tube 110 may have a diameter similar to that of the projectile(s) 104 to facilitate the acceleration of the projectile(s) 104 through the launch tube 110 using pressure from one or more propellant materials within the breech tube 112. For example, when a projectile 104 is loaded into the breech tube 112, the projectile 104 may seat within a throat 114 between the breech tube 112 and launch tube 110, the throat 114 constituting a region of narrowed diameter relative to that of the breech tube 112. In some implementations, the throat 114 may include a separate member that is engaged to the launch tube 110 or breech tube 112. In other implementations, the throat 114 may be a unitary member with one or both of the launch tube 110 or breech tube 112. The projectile 104 may include one or more portions of increased diameter, sealing members, or shearable members such as a snap ring that may contact the inner diameter of the throat 114 or of the launch tube 110 to prevent movement of the projectile 104 through the launch tube 110 until pressure from the propellant material(s) within the breech tube 112 is sufficient to shear or degrade the portion of increased diameter, sealing member, or shearable member. After the pressure has sheared or degraded at least a portion of the projectile, the pressure may cause the remainder of the projectile to be accelerated through the launch tube 110 at sufficient velocity to impact the geologic material 106, extend the borehole 102, and form debris 108.

For example, surface equipment 116 positioned at the surface 118 of the borehole 102 may transport projectiles 104, propellant materials, or other materials into the breech tube 112 via one or more propellant conduits 120, such as coiled tubing. In other implementations, the surface equipment 116 may be located within the borehole 102. For example, one or more air compressors, tanks or other sources of propellant material, containers that contain projectiles 104, and so forth, may be positioned within the borehole 102 at a location where materials may be provided into the breech tube 112. In still other implementations, one or more materials used to accelerate the projectile 104 may be generated within the borehole 102. For example, devices for performing electrolysis on water or other fluids within the borehole 102 may be used to generate hydrogen, oxygen, or other propellant materials within the borehole 102, eliminating the need to provide propellant materials using surface equipment 116 or downhole sources of propellant materials. Propellant material(s) may be provided to the breech tube 112 to increase a pressure behind the projectile 104. Ignition of the propellant material(s) or the pressure of the propellant material(s) may impart a force to the projectile 104 to force the projectile 104 past the throat 114 and accelerate the projectile through the launch tube 110, out the first end of the launch tube 110, and into contact with the geologic material 106 at the end of the borehole 102. In other implementations, an electromagnetic force may be used to accelerate the projectile 104 in addition to or in place of pressure from propellant materials. In some implementations, passage of the projectile 104 through the launch tube 110 may impart a ram effect to the projectile 104, the launch tube 110 functioning as a ram accelerator. For example, interactions between the projectile 104 and one or more interior features of the launch tube 110, such as baffles, rails, or other types of variations in the internal diameter of the launch tube 110, may increase the speed of the projectile 104 as it passes through the launch tube 110, in some implementations in combination with the force imparted to the projectile 104 using pressurized or combustible gas, or other propellant materials.

As described previously, interactions between projectiles 104 and the geologic material 106 may form debris 108. In some cases, the sizes of at least a portion of the debris 108 may be large enough to impair movement of the debris 108 using fluid, such as drilling mud or other fluids that may be provided into the borehole 102 to move the debris 108 from the bottom of the borehole 102. In some implementations, one or more crushing devices may be used to reduce the size of the debris 108. After reducing the size of the debris 108, the debris 108 that has been reduced in size may be moved through use of drilling fluid, another fluid, or other sources of motive force. In some implementations, the crushing device(s) may include use of one or more successive projectiles 104, which may be accelerated through the launch tube 110 to interact with at least a portion of the debris 108. Interaction between the projectile(s) 104 and the debris 108 may reduce a size of the debris 108, such as by breaking or otherwise degrading larger pieces of debris to form smaller pieces.

In other implementations, the crushing device(s) may include a drill bit 122. For example, FIG. 1 depicts a drill bit 122 positioned at the first end of the launch tube 110. The drill bit 122 may be moved into contact with the debris 108, such as by lowering a drilling conduit 124, such as a drill pipe, to which the drill bit 122 is engaged. The drill bit 122 may be rotated using rotational force imparted by movement of the drilling conduit 124, such as through use of one or more motors or other sources of motive force located at the surface 118 or within the borehole 102. Interactions between the drill bit 122 and the debris 108 may reduce a size of the debris 108, which may enable movement of drilling mud or other fluid to remove the debris 108 from the bottom of the borehole 102. For example, drilling fluid may be provided into the borehole 102 through the drilling conduit 124, such as to cool and lubricate the drill bit 122 during use, provide motive force, and so forth. The drilling fluid may entrain at least a portion of the debris 108, such as by forming a slurry, then move the debris 108 away from the bottom of the borehole 102 and toward the surface 118, such as by moving up through an annular space 126 between the drilling conduit 124 and the wall of the borehole 102. In some implementations, the wall of the borehole 102 may include one or more sections of casing that may be lowered into the borehole 102 as the borehole 102 is extended using projectiles 104 to displace geologic material 106. Because interactions between the projectiles 104 and the geologic material 106 are used to extend the borehole 102, while the drill bit 122 is primarily used to contact debris 108 and reduce the size thereof, wear on the drill bit 122 and the force and energy required to operate the drill bit 122 may be reduced when compared to conventional drilling operations. For example, using the techniques described herein, use of the drill bit 122 to penetrate through hard rock may be omitted. Projectile impacts may instead be used to extend a borehole 102 while the drill bit 122 is used to reduce the size of resulting debris 108. In some implementations, the drill bit 122 may be used in addition to projectile impacts to extend the borehole 102. For example, the drill bit 122 may be used to extend the borehole 102 while a subsequent projectile 104 is being loaded and propellant materials are being provided into the breech tube 112. As another example, the drill bit 122 may be used to advance the borehole 102 through selected materials, such as earth or porous rock, while projectile impacts are used to advance the borehole 102 through hard rock. While FIG. 1 depicts the launch tube 110 positioned within and aligned with the longitudinal axis of the drilling conduit 124, in other implementations, the launch tube 110 and drilling conduit 124 may include separate conduits. In still other implementations, the launch tube 110 may be positioned within the drilling conduit 124 at a location that is not aligned with the longitudinal axis of the drilling conduit 124, such that projectiles 104 may be accelerated to impact regions of geologic material 106 that are not directly in front of the end of the drilling conduit 124. For example, the orientation of the end of the launch tube 110 relative to the geologic material 106 may change as the drilling conduit 124 is rotated, and the times at which projectiles 104 are accelerated may be used to affect the portion of the geologic material 106 that is impacted by the projectiles 104.

Figure 2:
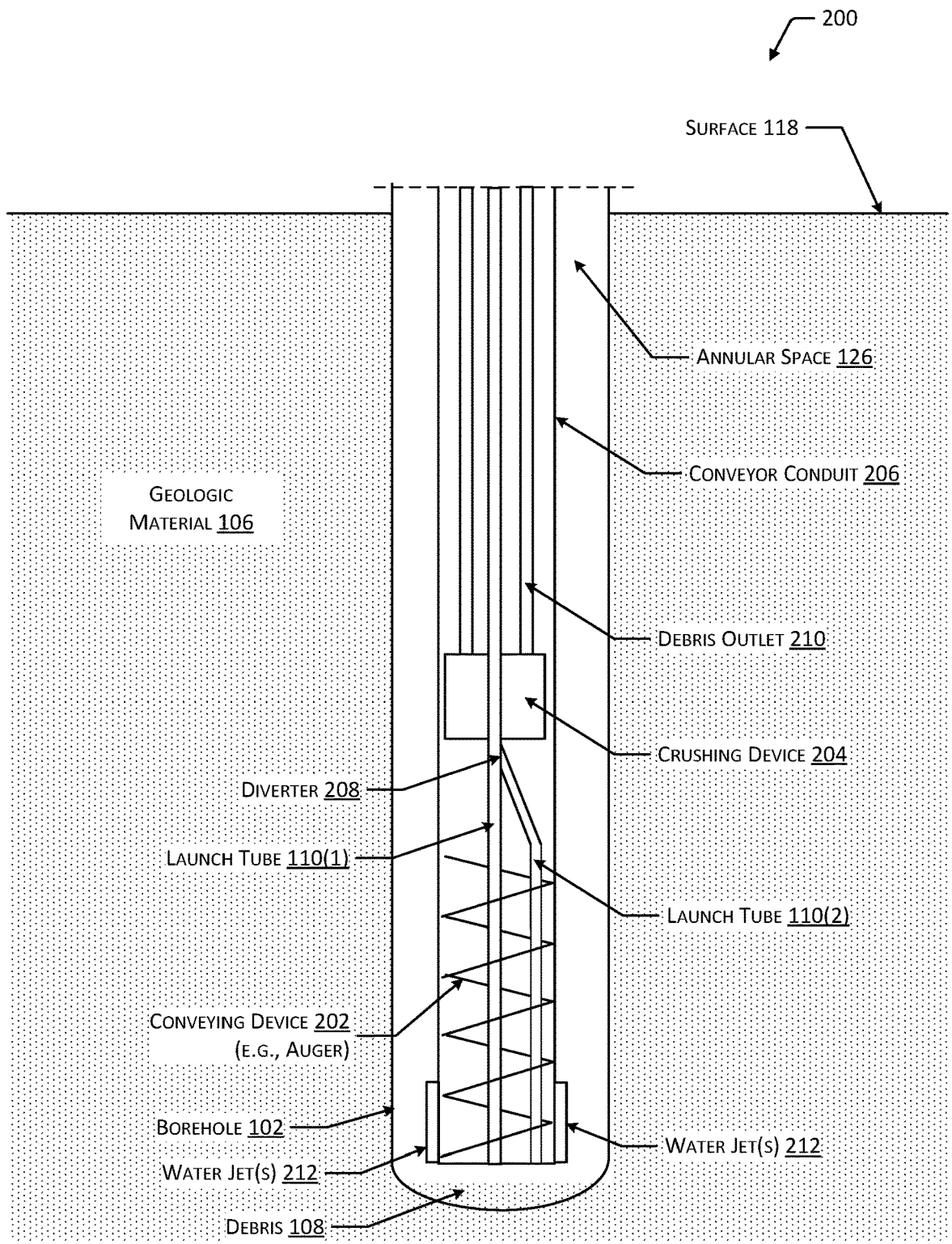
FIG. 2 depicts an implementation of a system in which a conveying device is used to move debris created by an interaction between a projectile and geologic material toward a crushing device.

In some implementations, one or more crushing devices that are positioned away from the first end of the launch tube 110 may be used. For example, FIG. 2 depicts an implementation of a system 200 in which a conveying device 202 is used to move debris 108 created by an interaction between a projectile 104 and geologic material 106 toward a crushing device 204. The conveying device 202 and crushing device 204 are shown within a conveyor conduit 206 positioned within a borehole 102. The conveyor conduit 206 may include any type of pipe, tube, string, or other type of conduit, such as drilling pipe, casing, and so forth. In some implementations, a wall of the borehole 102 may function as a conveyor conduit 206 and use of a separate conveyor conduit 206 may be omitted. As described with regard to FIG. 1, one or more projectiles 104 may be accelerated through one or more conduits, such as a launch tube 110, using one or more propellant materials, to cause the projectile(s) 104 to exit the conduit(s) and interact with a region of geologic material 106. Interactions between the projectiles 104 and the geologic material 106 may form debris 108, such as portions of rock or another type of material that are broken from a working face of the geologic material 106 by an impact or other type of interaction with a projectile 104. The system 200 of FIG. 2 is shown having two launch tubes 110. A first launch tube 110(1) is shown extending centrally through (e.g., aligned with a longitudinal axis of) the conveyor conduit 206, while a second launch tube 110(2) is shown positioned off-center relative to the longitudinal axis of the conveyor conduit 206. A diverter 208, such as one or more valves or other movable components, may be used to control movement of projectiles 104 into the first launch tube 110(1) or second launch tube 110(2). While FIG. 2 depicts two launch tubes 110, any number of launch tubes 110 having any position relative to the conveyor conduit 206 may be used. For example, acceleration of a projectile 104 through different launch tubes 110 may enable different regions of geologic material 106 to be affected by contact with a projectile 104. Continuing the example, accelerating a projectile 104 into a region of the geologic material 106 located directly below the conveyor conduit 206, such as by using the first launch tube 110(1), may be used to extend the borehole 102 in a generally straight direction. Acceleration of a projectile 104 into a region of geologic material 106 located below the second launch tube 110(2) may be used to extend the borehole 102 in a curved or angled direction, or to pre-condition a perimeter of a region of geologic material 106 before impacting the region with a projectile 104 accelerated through the first launch tube 110(1). In some implementations, the second launch tube 110(2) may be movable, such as through rotation of the conveyor conduit 206 or another portion of the system, to enable the region of geologic material 106 below the second launch tube 110(2) to be changed.

As described with regard to FIG. 1, in some cases, at least a portion of the debris 108 formed from the interaction between a projectile 104 and the geologic material 106 may have a size that prevents movement of the debris 108 using fluid. For example, at least a portion of the debris 108 may include large pieces of rock that are broken from a working face of the geologic material 106 due to an impact by a projectile 104. A conveying device 202 may be used to move debris 108 away from the end of the borehole 102 and toward the crushing device 204. In some implementations, as shown in FIG. 2, the conveying device 202 may include an auger. For example, rotational movement of the auger may move at least a portion of the debris 108 upward along the blades of the auger through the conveyor conduit 206 toward the crushing device 204. The crushing device 204 may crush the debris 108, reducing a size thereof. In some implementations, a screen or other mechanism for limiting the size of debris 108 conveyed using the auger may be positioned at or near the base of the conveyor conduit 206. For example, pieces of debris 108 that are larger than a selected size may be retained within the borehole 102 so that a subsequent projectile impact may reduce the size of the debris 108. The reduced-size debris 108 may then be moved toward the crushing device 204 by the auger. One or more debris outlets 210, or in some implementations, a portion of the conveyor conduit 206 above the crushing device 204, may be used to move the debris 108 that is crushed by the crushing device 204 toward the surface 118. For example, the crushing device 204 may include a gyratory crusher that reduces the debris 108 to a fine-grained slurry that may be entrained within a fluid and transported toward the surface 118. As described previously, while FIG. 2 depicts the launch tubes 110 within the conveyor conduit 206, such as passing through openings with the blades of the auger, in other implementations, one or more launch tubes 110 may be positioned within the conveyor conduit 206 adjacent to the conveying device 202, or external to the conveyor conduit 206. Because the debris 108 may be transported toward the surface 118 within the conveyor conduit 206, the annular space 126 between the conveyor conduit 206 and the wall of the borehole 102 may be used for other purposes, such as lowering of casing into the borehole 102, providing materials into or removing materials from the borehole 102, and so forth. For example, the annular space 126 may accommodate coiled tubing or other types of conduits for providing propellant materials or projectiles 104 to the launch tubes 110, providing water into the borehole 102 for formation of propellant material(s) using electrolysis, providing air or another fluid into the borehole 102 to remove material from the launch tubes 110 or other portions of the system 200, and so forth.

In some implementations, the system 200 may include one or more pre-conditioning devices, such as water jets 212, that may accelerate a pre-conditioning material, such as water, toward a portion of the geologic material 106. For example, one or more conduits within the conveyor conduit 206 or annular space 126 may be used to convey water to the waterjet(s) 212, or the waterjet(s) 212 may communicate with another source of water located within the borehole 102. In some implementations, the water jets 212 may accelerate water, or another pre-conditioning material, into contact with at least a portion of a perimeter of the region of geologic material 106 to be impacted by the projectile 104. Pre-conditioning the perimeter of a region of geologic material 106 may control the manner in which shock waves caused by projectile impacts propagate through the geologic material 106, enabling the shape of the borehole 102 to be controlled as the borehole 102 is extended. For example, water from the water jet(s) 212 may be used to pre-cut along at least a portion of the perimeter of the region of geologic material 106. Interactions between projectiles 104 and the pre-conditioned region of geologic material 106 may break, pulverize, or otherwise degrade the material, forming a section of the borehole 102 having the shape of the pre-conditioned profile.

Use of water jets 212, or other mechanisms, to pre-condition or pre-cut a rock face or other geologic material 106 in a desired cross-sectional shape may increase the rate at which the borehole 102 may be extended and enable the borehole 102 to be provided with irregular cross-sectional shapes. For example, by using water jets 212 to form a square or rectangular perimeter shape, or another desired shape for the cross-section of a portion of a borehole 102, the breakage of rock using projectile impacts may be controlled. The extension of the borehole 102 and near-bore rock damage may be controlled by use of the water jets 212 or other pre-conditioning techniques to create a gap, or a region of weakened rock or rock having a different density. The region of the rock affected by the water jets 212 or other device(s) may simulate a free face reflection zone so that a shock wave caused by a projectile impact changes from a compression wave to a tension wave, which pulls and breaks the geologic material 106 along the perimeter defined by the pre-conditioned profile. For example, creation of a cut or pre-conditioned region of rock may provide a boundary zone where projectiles that impact rock within the pre-conditioned region create a tension wave that is affected by the cut or weakened region of rock as described above.

While FIG. 2 depicts pre-conditioning devices that include water jets 212, in other implementations, other methods for pre-conditioning or cutting the geologic material 106 may be used. For example, rock saw blades, rotating cutters, disc cutters, road headers, water jets with added abrasives, thermal spallation, thermal conditioning (e.g., heating and breaking rock), plasma jet cutters, pre-drilling, and so forth may be used in addition to or in place of water jet 212 heads to pre-condition a desired profile. In some implementations, projectile impacts may be used to pre-condition a perimeter of a region of geologic material 106. For example, projectiles 104 may be accelerated using the second launch tube 110(2), or another launch tube 110 positioned external to the conveyor conduit 206, to impact at least a portion of a perimeter of a region of geologic material 106. Subsequent projectile impacts from a projectile 104 accelerated using the first launch tube 110(1) may then break or otherwise degrade geologic material 106 within the region defined by the pre-conditioning of the geologic material 106.

Additionally, while FIG. 2 depicts the system 200 including two water jets 212, which may be positioned to accelerate pre-conditioning material to different portions of the geologic material 106 using articulating heads or movement of the conveyor conduit 206, in other implementations, other numbers of water jets 212 or other types of pre-conditioning devices may be used. Further, while FIG. 2 depicts the water jets 212 positioned external to, and at the base of, the conveyor conduit 206, in other implementations, pre-conditioning devices may be positioned at any location within the borehole 102. In some implementations, one or more water jets 212 may be incorporated within the blades of the auger, which may orient the water jets 212 toward a perimeter of a region of the geologic material 106 as the auger rotates.

Figure 3:
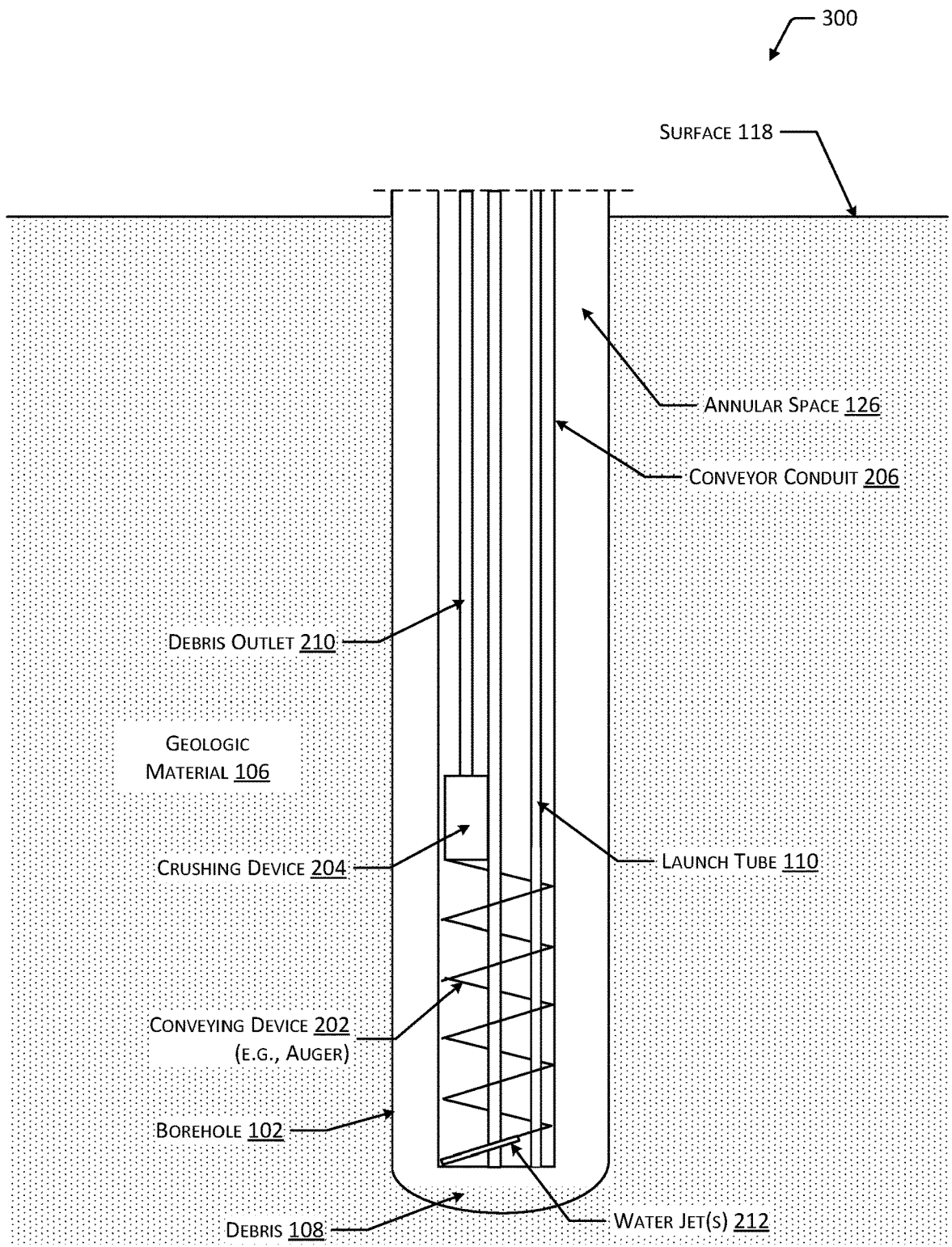
FIG. 3 depicts an implementation of a system in which a pre-conditioning device, such as a water jet, is integrated within a conveying device, such as an auger.

For example, FIG. 3 depicts an implementation of a system 300 in which a pre-conditioning device, such as a water jet 212, is integrated within a conveying device 202, such as an auger. In the system 300 shown in FIG. 3, a single launch tube 110 is positioned within the conveyor conduit 206 at a location that is spaced apart from the longitudinal axis of the conveyor conduit 206. For example, rotation of the conveyor conduit 206, conveying device 202, or other portion of the system 300 may enable the launch tube 110 to be moved relative to the geologic material 106, such as to orient the lower end of the launch tube 110 toward a selected region of the geologic material 106. One or more water jets 212 may be incorporated proximate to the lower end of the conveying device 202, which is shown in FIG. 3 as an auger. Conduits for flowing water to the water jet(s) 212 may be incorporated within the blades of the auger, other portions of the conveying device 202, or within the conveyor conduit 206. As the auger rotates, water from the water jet(s) 212 may interact with at least a portion of a perimeter of a region of the geologic material 106. Subsequently, a projectile 104 may be accelerated through the launch tube to contact the region of the geologic material 106. The pre-conditioned perimeter of the region may control the manner in which the geologic material 106 within the region is affected by interactions with one or more projectiles 104, such as by controlling a shape of a section of the borehole 102 as it is extended. Debris 108 formed by the interaction between the projectile(s) 104 and the geologic material 106 may be moved from the bottom of the borehole 102 through the conveyor conduit 206 by the conveying device 202, toward a crushing device 204 which may reduce a size of the debris 108. The reduced-sized debris 108 may be moved toward the surface 118 of the borehole 102 via a debris outlet 210 or the conveyor conduit 206, such as by using a fluid to entrain the debris 108. In some implementations, casing or other materials for supporting the integrity of the borehole 102 may be positioned within the annular space 126 between the conveyor conduit 206 and the wall of the borehole 102 while the conveyor conduit 206, or one or more other conduits within the conveyor conduit 206, may be used to transport projectiles 104, propellant materials, water, air, other fluids, and so forth.

Figure 4A:
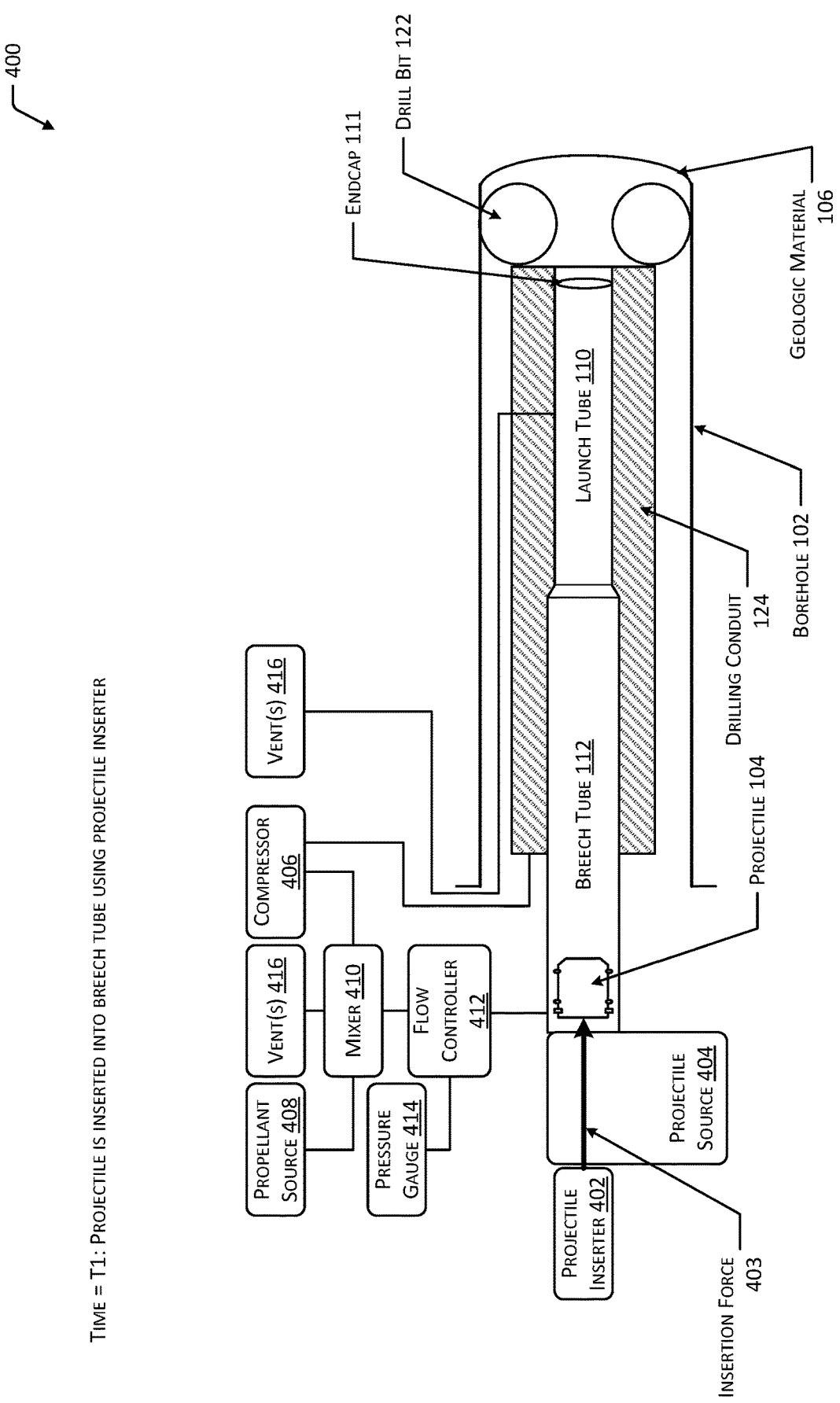
FIGS. 4A through 4G depict an implementation of a method for extending a borehole by accelerating one or more projectiles into a region of geologic material and removing debris from the borehole and system.

FIGS. 4A through 4G depict an implementation of a method 400 for extending a borehole 102 by accelerating one or more projectiles 104 into a region of geologic material 106 and removing debris 108 from the borehole 102 and system 100. As shown in FIG. 4A, at a first time T1, a projectile 104 is inserted into a breech tube 112 of the system using a projectile inserter 402. As described with regard to FIG. 1, the breech tube 112 may include a pipe or other type of conduit having a first diameter, which is engaged to a launch tube 110 having a second diameter smaller than that of the breech tube 112. A throat 114 between the breech tube 112 and launch tube 110 may include a region of narrowing diameter between the breech tube 112 and launch tube 110 where a projectile 104 may be placed before accelerating the projectile 104 through the launch tube 110. In other implementations, one or more of the breech tube 112, throat 114, or launch tube 110 may include a single member rather than separate components that are engaged together.

In some implementations, the projectile inserter 402 may include a mechanical member, such as a rod or plunger, which may be extended to apply a mechanical insertion force 403 to the projectile 104 to move the projectile 104 from a loading area associated with the projectile source 404 into the breech tube 112. In other implementations, the projectile inserter 402 may use an insertion force 403 imparted by movement or pressure of fluid. The projectile source 404 may include a tank, container, or conduit in communication with the breech tube 112. In some implementations, the projectile source 404 may include a loading area that receives projectiles 104 from the surface 118 of the borehole 102, such as via coiled tubing or another type of conduit. Additionally, in some implementations, the projectile source 404 may include mechanical members or conduits for receiving fluid to cause movement of projectiles 104 into and from a position from which the projectile inserter 402 may apply an insertion force 403 to move a projectile 104 into the breech tube 112.

In some implementations, an endcap 111 may be inserted into the launch tube 110 prior to insertion of the projectile 104. The endcap 111 may be engaged with the launch tube 110 using one or more external features of the endcap 111 or one or more interior features within the launch tube 110. Placement of an endcap 111 may displace material within the launch tube 110 into the borehole 102 and isolate the launch tube 110 from the environment within the borehole 102, enabling gas or other material within the launch tube 110 to be vented or otherwise removed from the launch tube 110. Isolation of the launch tube 110 from the borehole 102 and venting of material from within the launch tube 110 may enable a pressure within the launch tube 110 to be controlled and prevent material or pressure within the launch tube 110 from interfering with movement of the projectile 104.

As described with regard to FIG. 1, various types of surface equipment 116 may be used to provide propellant materials, projectiles 104, air, water, or other fluids or materials into the breech tube 112 or other portions of the system 100. In other implementations, one or more components of the surface equipment 116 may be located within the borehole 102 rather than at the surface 118 thereof. As shown in FIG. 4A, the surface equipment 116 may include a compressor 406 which may be used to provide air or another compressed or pressurized fluid into various portions of the system 100, such as for cooling portions of the system 100, moving debris 108 away from one or more portions of the system 100, or moving other materials into or from various portions of the system 100. The surface equipment 116 may also include a propellant source 408 which may include one or more tanks, containers, or other sources of materials that may be used to apply a force to a projectile 104 to accelerate the projectile 104 through the launch tube 110. In some implementations, the propellant material(s) may include hydrogen gas. In other implementations, the propellant material(s) may include oxygen or other types of fluids. One or more mixers 410 or other types of equipment may be used to combine air or another fluid from the compressor 406 with one or more propellant materials from the propellant source 408. The mixer 410 may be controllable to select a ratio of material from the propellant source 408 and material from the compressor 406 to provide to a flow controller 412. The flow controller 412 may provide material from the mixer 410 into the breech tube 112 at a selected rate. In some implementations, the flow controller 412 may include an igniter, or a separate igniter device may be associated with the breech tube 112 or the surface equipment 116, which may be used to ignite one or more propellant materials to provide a force to the projectile 104. One or more pressure gauges 414 may be used to determine a pressure associated with propellant materials, or other materials, in the flow controller 412 or breech tube 112. For example, pressure gauges 414 may be used to determine whether the pressure of propellant materials in the breech tube 112 is sufficient to ignite the propellant materials to accelerate a projectile 104, or whether the pressure of other materials in the breech tube 112 or another portion of the system 100 is sufficient to vent or evacuate material from the system 100. For example, the system 100 may include one or more vents 416 which may be used to evacuate air, propellant material(s), or other fluids or materials from the launch tube 110 or other portions of the system 100.

Figure 4B:
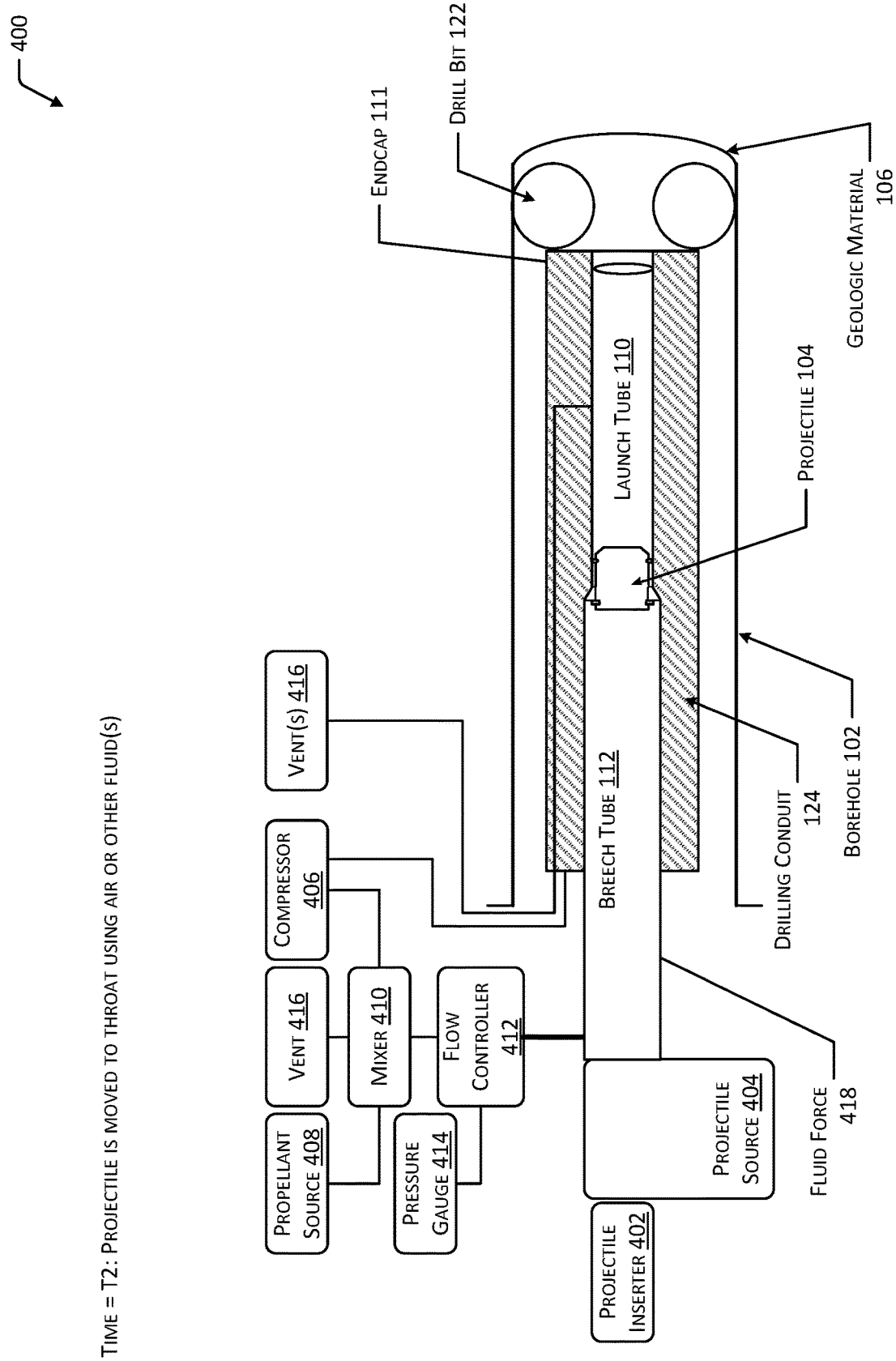

As shown in FIG. 4B, at a second time T2, the projectile 104 may be moved to the throat 114 using air or other fluids, which may impart a fluid force 418 to the projectile 104. For example, after the projectile inserter 402 is used to move a projectile 104 from the projectile source 404 into the breech tube 112, a fluid force 418 imparted by air or another fluid from the compressor 406, or in some implementations, one or more propellant materials from the propellant source 408, may be used to move the projectile 104 through the breech tube 112. The projectile 104 may include a portion having a diameter greater than that of the launch tube 110, such as a snap ring or other type of shearable, frangible, or deformable portion, such that the projectile 104 is seated in the throat 114 between the breech tube 112 and launch tube 110 when moved using the fluid. Until pressure within the breech tube 112 is sufficient to cause the shearable, frangible, or deformable portion of the projectile 104 to be removed from the projectile 104 or deformed to reduce a diameter of the projectile 104, the reduced diameter of the launch tube 110 may prevent further movement of the projectile past the throat 114 and through the launch tube 110.

Figure 4C:
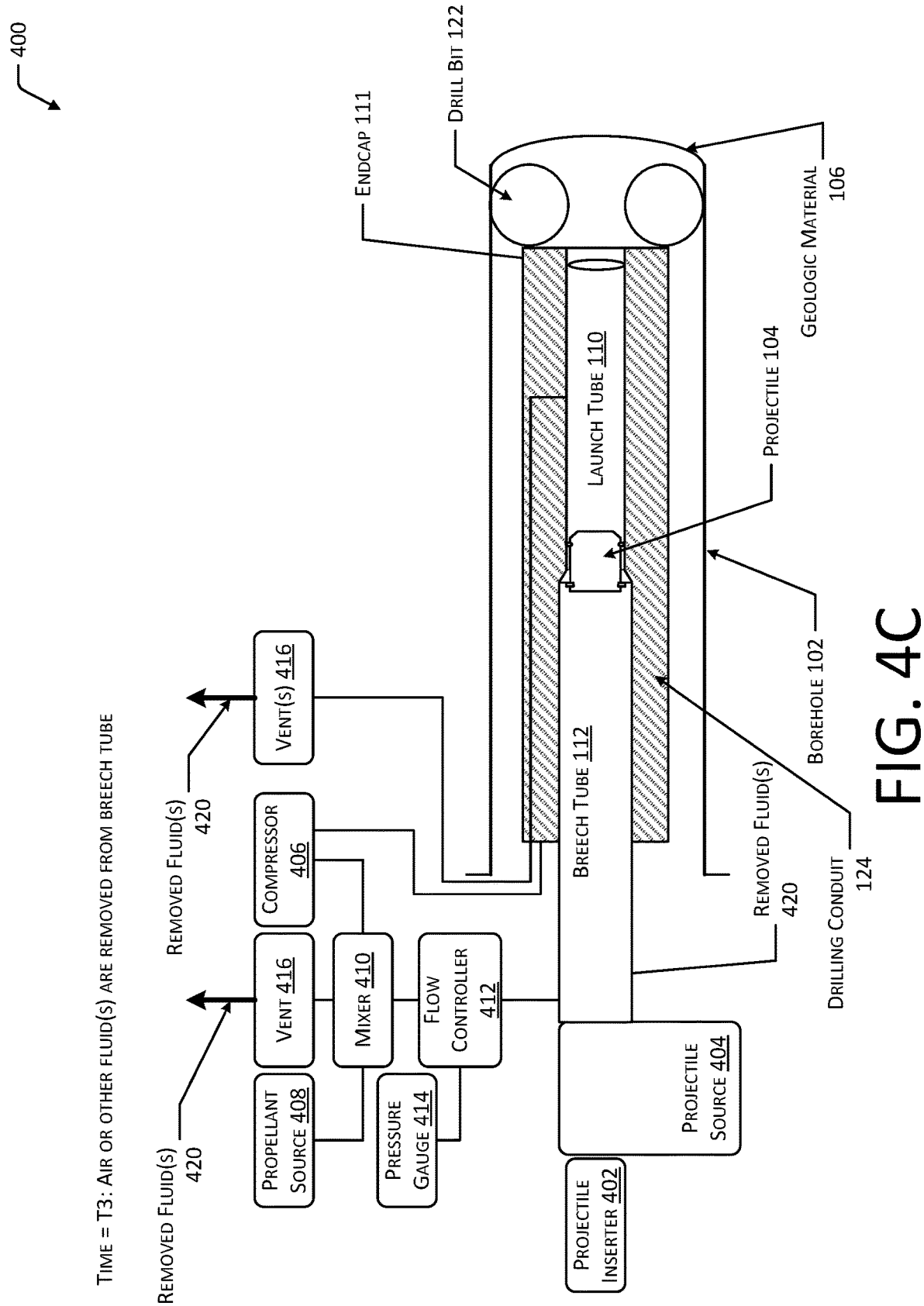

As shown in FIG. 4C, at a third time T3, air or other fluid(s) may be removed from the breech tube 112 after positioning the projectile 104 in the throat 114. For example, the breech tube 112 may be at least partially evacuated, or the pressure in the breech tube 112 may be otherwise reduced. Continuing the example, removed fluids 420 may be flowed from the breech tube 112 to one or more vents 416 associated with the surface equipment 116 or with the breech tube 112 itself. The removed fluids 420 may include the air or other materials from the breech tube 112 that were used to move the projectile 104 into the throat 114, or that may otherwise remain in the breech tube 112 from previous operations, such as acceleration of a previous projectile 104. In some implementations, air or other fluid(s) may be removed from the launch tube 110 in addition to or in place of removal of air or fluid(s) from the breech tube 112.

Figure 4D:
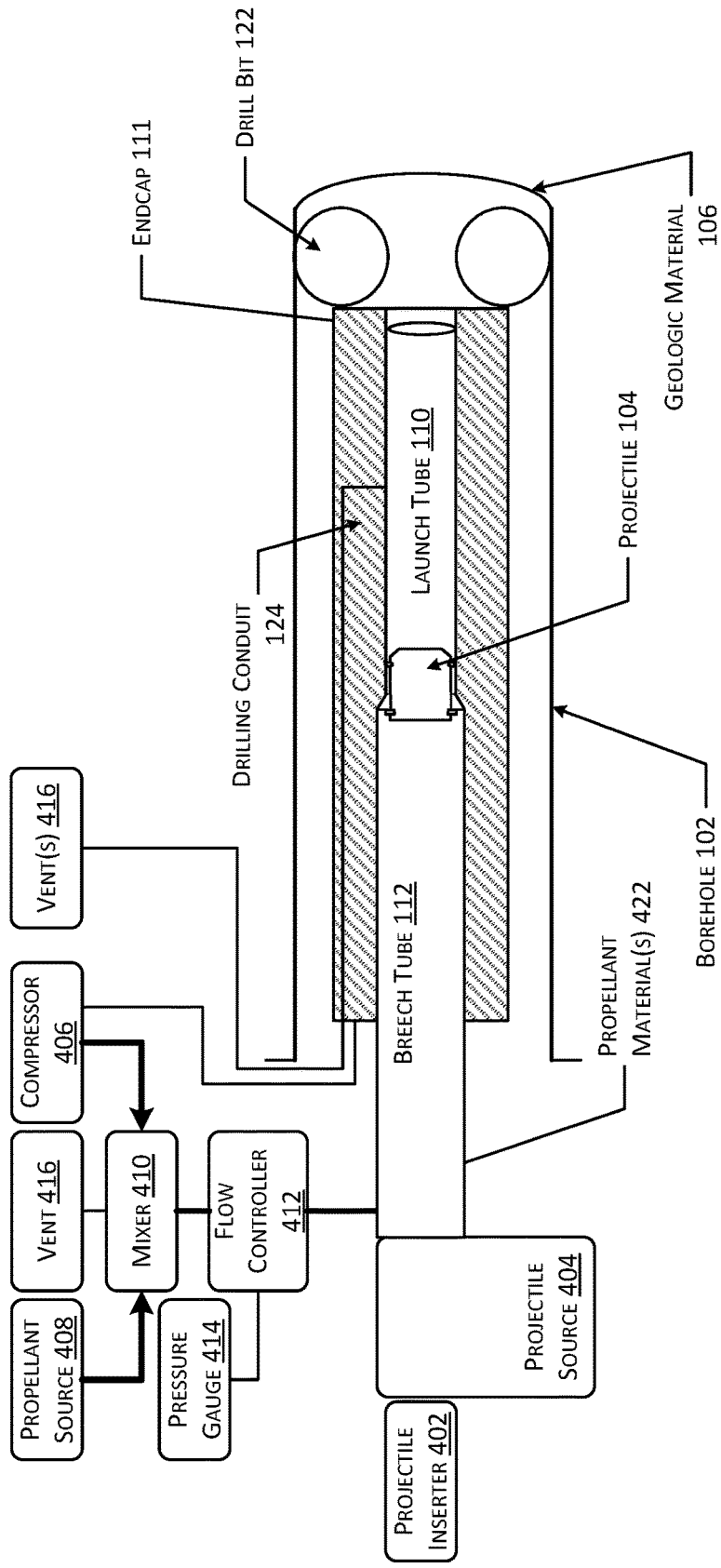

As shown in FIG. 4D, at a fourth time T4, propellant material(s) 422 may be provided into the breech tube 112. As described previously, in some implementations, propellant material(s) 422 may include one or more of hydrogen or oxygen. In other implementations, propellant material(s) 422 may include one or more other combustible gasses or gasses that are able to be pressurized to a pressure sufficient to accelerate the projectile 104 through the launch tube 110. In some implementations, in-situ propellant material(s) 422 may be used. For example, a propellant material 422 may be created using one or more devices for performing electrolysis within the breech tube 112, or created in another portion of the system 100 and flowed into the breech tube 112. As another example, propellant material(s) 422 may be entrained in drilling mud or other fluid, enabling transport of the propellant material(s) 422 into the borehole 102 in the same fluid conduit as those used to transport the drilling mud or other fluid. In some implementations, a portion of the material of the projectile 104, itself, may include a fuel or propellant that may be combusted or pressurized. As one or more propellant materials 422 are provided into the breech tube 112, one or more pressure gauges 414 may be used to determine the pressure or concentration of the propellant material(s) 422. A sealing member of the projectile 104 may interact with the throat 114, launch tube 110, or breech tube 112 to prevent passage of propellant material(s) into the launch tube 110, enabling the pressure of the propellant material(s) 422 in the breech tube 112 to increase as one or more additional propellant materials 422 are provide into the breech tube 112.

Figure 4E:
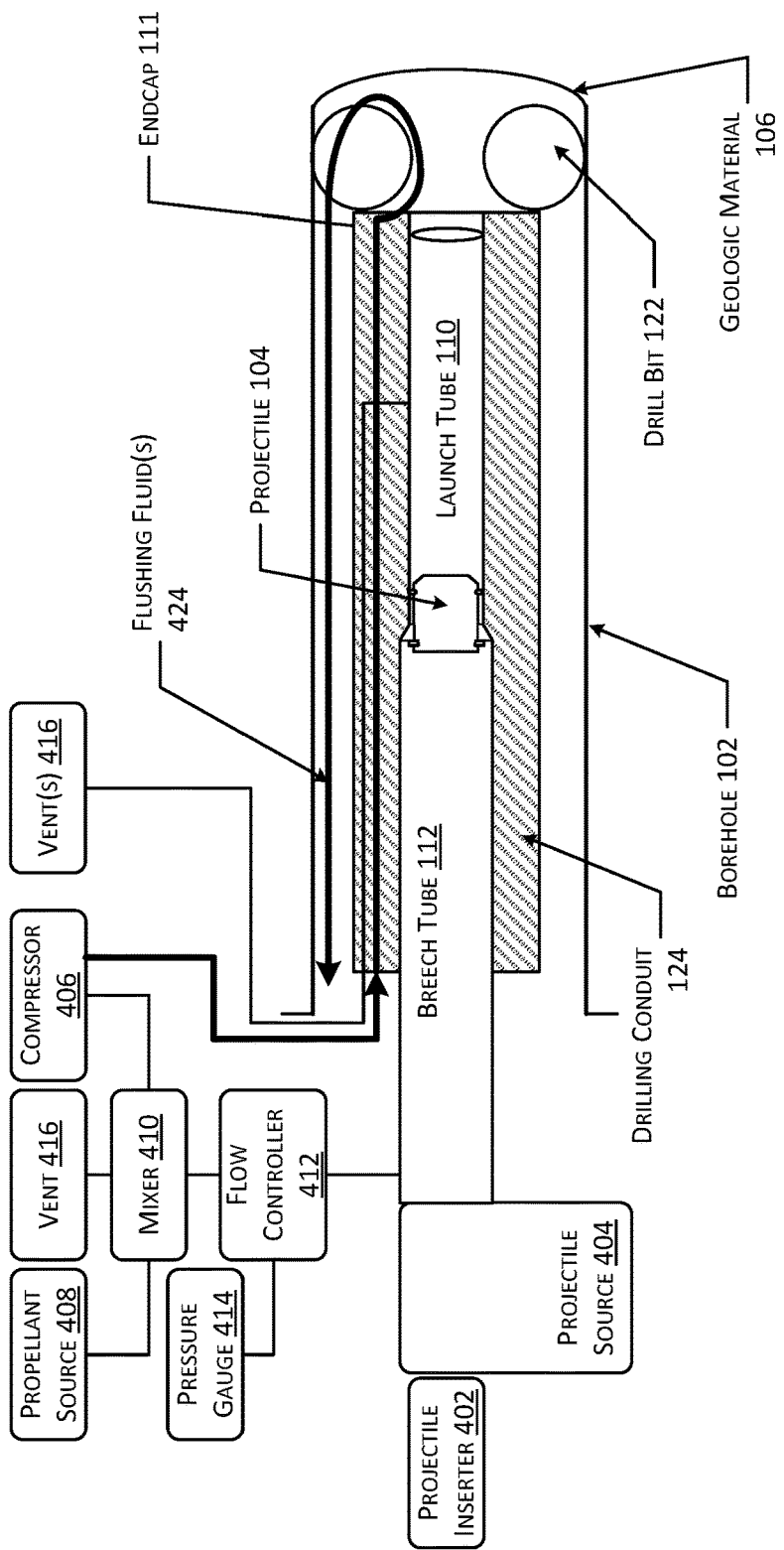

As shown in FIG. 4E, at a fifth time T5, debris 108 may be flushed from the system 100 using air or other flushing fluids 424. For example, the compressor 406 or another source of air or other flushing fluid(s) 424 may be in communication with a drilling conduit 124 that is used to rotate and provide fluid to a drill bit 122 at or near the end of the launch tube 110. In some implementations, the breech tube 112 and launch tube 110 may be positioned within the drilling conduit 124. In other implementations, the breech tube 112 and launch tube 110 may be a separate conduit outside of the drilling conduit 124. Additionally, while FIGS. 4A through 4G depict the drill bit 122 near the end of the launch tube 110, in other implementations, the drill bit 122 may be near the end of the borehole 102, while the end of the launch tube 110 may be spaced farther from the bottom of the borehole 102. For example, a projectile 104 may be accelerated through the launch tube 110 and may exit the launch tube 110 at a selected distance from a working face of the geologic material 106.

Air or other flushing fluid(s) 424 from the compressor 406 that are flowed through the drilling conduit 124 may remove debris 108, fluid, or other material from the drilling conduit 124, drill bit 122, bottom of the borehole 102, launch tube 110, and annular space 126 between the drilling conduit 124 and wall of the borehole 102. For example, air may be flowed through the drilling conduit 124 toward the bottom of the borehole 102, where the air may push debris 108 or other material upward and out of the borehole 102 through the annular space 126. In other implementations, air or other flushing fluid(s) 424 may be provided into the annular space 126, and debris 108 or other material moved by the air or other flushing fluid(s) 424 may move out of the borehole 102 through the drilling conduit 124. In cases where a drill bit 122 is not used, air may be flowed into or from the borehole 102 using other conduits or the annular space 126 independent of a drill bit 122.

Figure 4F:
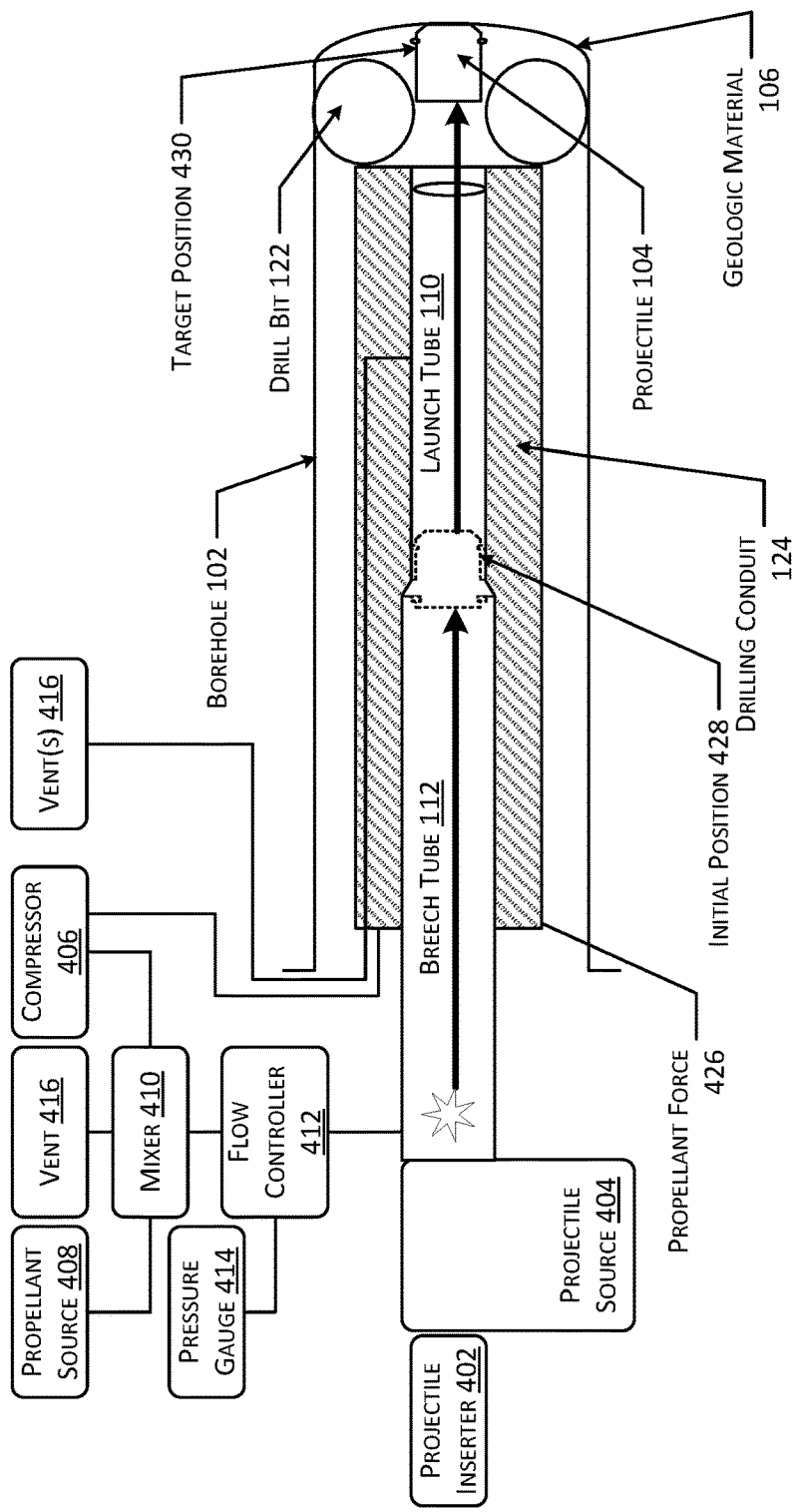

As shown in FIG. 4F, at a sixth time T6, the breech tube 112 may be isolated and one or more propellant materials may be ignited to accelerate the projectile 104 through the launch tube 110. As described previously, a sealing member of the projectile 104 may cause the projectile 104 to interact with the throat 114, launch tube 110, or breech tube 112 to prevent passage of propellant material(s) from the breech tube 112 into the launch tube 110, effectively isolating the breech tube 112 from the launch tube 110. One or more valves, seals, or other types of closure or sealing mechanisms may be used to isolate the breech tube 112 from the projectile source 404, flow controller 412, or other conduits in communication with the breech tube 112. Isolation of the breech tube 112 may enable the majority of the pressure associated with ignition of the propellant material(s) to apply a propellant force 426 to the projectile 104. The propellant force 426 applied to the projectile 104 may cause a snap ring or other shearable, frangible, or deformable portion of the projectile 104 to be removed or deformed, enabling the projectile 104 to pass from the throat 114 into the launch tube 110, moving from an initial position 428 within the throat 114 to a target position 430 where the projectile 104 may interact with a region of geologic material 106. Propellant force 426 from the propellant material(s) may continue to accelerate the projectile 104 through the launch tube 110. In some implementations, passage of the projectile 104 through the launch tube 110 may impart a ram effect to the projectile 104, the launch tube 110 functioning as a ram accelerator. For example, interactions between the projectile 104 and one or more interior features of the launch tube 110, such as baffles, rails, or other types of variations in the internal diameter of the launch tube 110, may increase the speed of the projectile 104 as it passes through the launch tube 110. The projectile 104 may exit the end of the launch tube 110 to interact with a region of the geologic material 106 and extend the borehole 102. In some implementations, the projectile 104 may pass through one or more valves, endcaps 111, or separator mechanisms within the breech tube or launch tube. In some cases, the projectile 104 may penetrate through these components, and the components may be replaced, such as by inserting subsequent components into the launch tube 110 or breech tube 112 using the projectile inserter 402, movement of fluid, or other techniques. In other cases, one or more of such components may be opened or moved from the path of the projectile 104 before accelerating the projectile 104 through the launch tube 104. In some implementations, a sealing member or other component of the projectile 104 may contact or extend close to the inner diameter of the launch tube 110, such that passage of the projectile 104 through the launch tube 110 removes debris 108, fluid, or other material from the launch tube 110. Interaction between the projectile 104 and the region of geologic material 106 impacted by the projectile 104 may create debris 108.

Figure 4G:
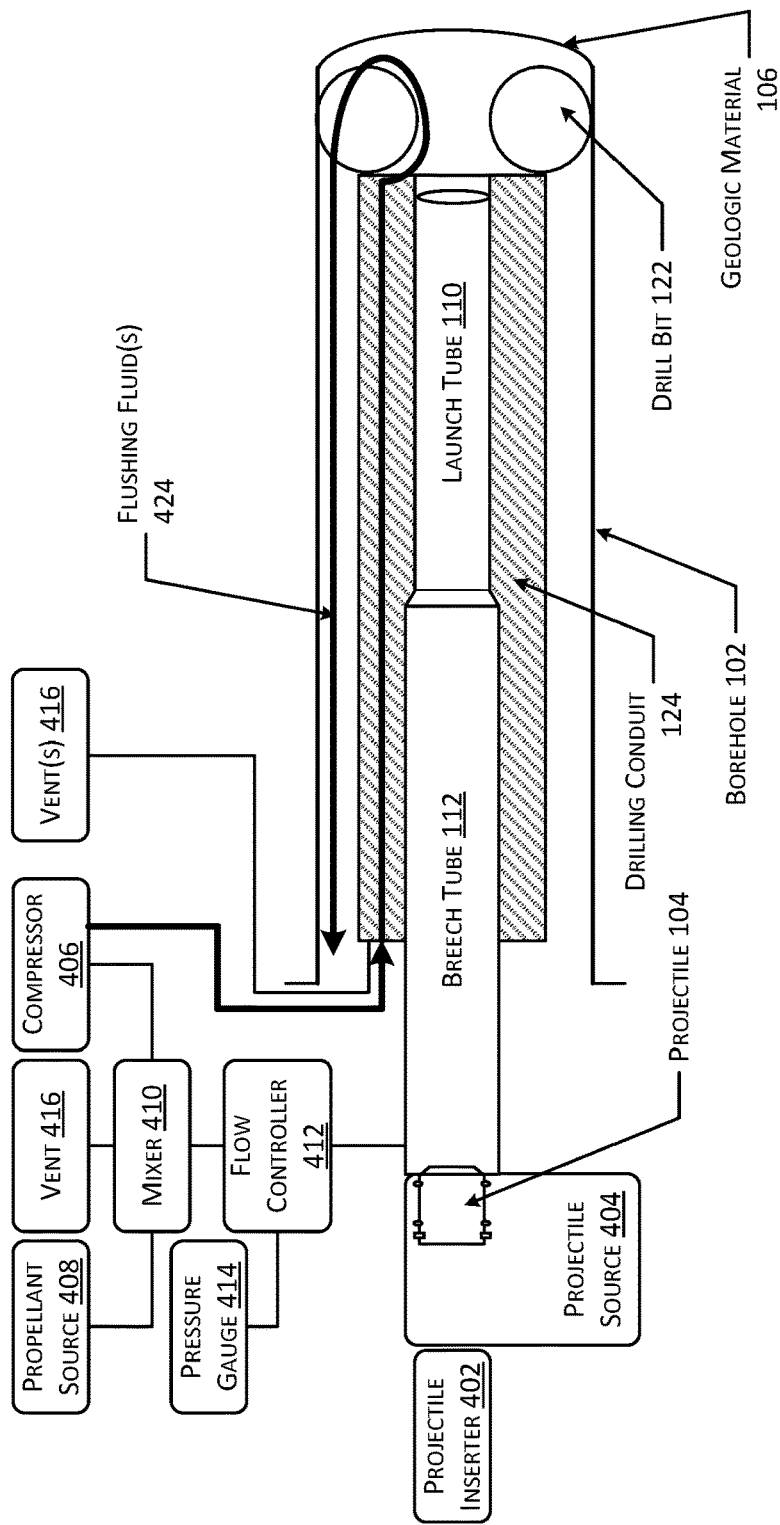

As shown in FIG. 4G, at a seventh time T7, debris 108 may be crushed using the drill bit 122 or another crushing device, the debris 108 may be flushed and the system 100 cooled using air or other flushing fluids 424, and a subsequent projectile 104 may be prepared for insertion. For example, after the interaction between the projectile 104 and the region of geologic material 106 forms debris 108, the drill bit 122 may contact and crush at least a portion of the debris 108, reducing a size of the debris 108. In other implementations, the debris 108 may be crushed or otherwise reduced in size by moving the debris 108 using a conveying device 202, such as an auger, toward a crushing device 204 located within a conduit, such as a gyratory crusher. In still other implementations, the debris 108 may be reduced in size by an interaction with a subsequent projectile 104. For example, the method 400 shown in FIGS. 4A through 4G may be repeated, and a projectile 104 that impacts the debris 108 may reduce the size of the debris 108. The compressor 406 or another source of air or another fluid may be used to provide the air or other fluid into the drilling conduit 124 to move the debris 108. The air or other flushing fluid 424 may move debris 108 that has been reduced in size toward the surface 118. In other implementations, drilling fluid may be provided into the drilling conduit 124, such as to cool and lubricate the drill bit 122, and the drilling fluid may entrain and move debris 108 toward the surface 118. For example, air, drilling fluid, or one or more other fluids may move debris 108 toward the surface via the annular space 126. In other implementations, air or drilling fluid may be provided into the annular space 126 and the fluid(s) and debris 108 may move toward the surface 118 through the drilling conduit 124. In still other implementations, debris 108 may be moved toward the surface 118 using one or more debris outlets 210 associated with a crushing device 204, as shown in FIG. 2. After the seventh time T7, the method 400 shown in FIGS. 4A through 4G may be repeated, and a subsequent interaction between a projectile 104 and geologic material 106 may be used to further extend a borehole 102.

As described previously with regard to FIGS. 2 and 3, in some implementations, a pre-conditioning device, such as one or more water jets 212, cutters, drills, projectile impacts, and so forth may be used to provide a pre-conditioning material into contact with at least a portion of a perimeter of a region of geologic material 106 before a projectile 104 is accelerated through the launch tube 110 to impact the region of geologic material 106. For example, after performing the step shown in FIG. 4G, during performance of any of the steps shown in FIGS. 4A through 4E, or before performing the step shown in FIG. 4F, a pre-conditioning material may be accelerated into contact with the geologic material 106 to prepare a perimeter of a region of the geologic material 106 prior to an interaction with a projectile 104.

Figure 5:
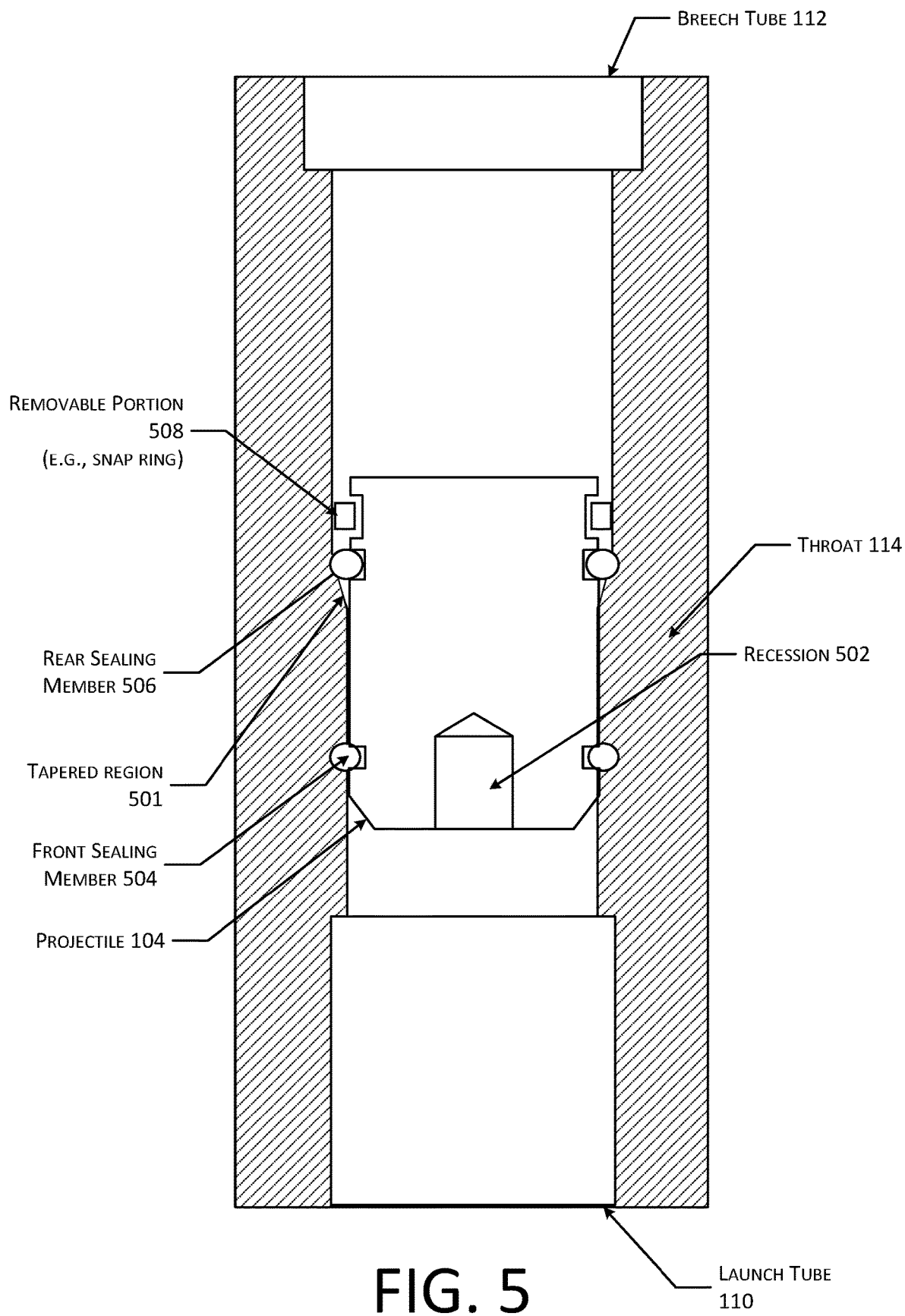
FIG. 5 is a diagram depicting an implementation of a projectile seated within a conduit.

FIG. 5 is a diagram 500 depicting an implementation of a projectile 104 seated within a conduit. As described with regard to FIGS. 1-4, a projectile 104 may be moved through a breech tube 112 to be seated at a throat 114 between the breech tube 112 and a launch tube 110. Pressure associated with propellant materials provided to the breech tube 112 may then be used to accelerate the projectile 104 through the launch tube 110. The launch tube 110 and at least a portion of the throat 114 may have a narrower diameter than that of the breech tube 112. For example, the throat 114 may include a tapered region 501 that connects a first portion of the throat 114 having a diameter similar to that of the breech tube 112 to a second narrower portion of the throat 114 having a diameter similar to that of the launch tube 110. The narrower diameter of the throat 114 and launch tube 110 may enable the projectile 104 to be retained in the throat 114 until pressure in the breech tube 112 is sufficient to force the projectile 104 into the launch tube 110, such has by shearing, removing, breaking, or deforming a portion of the projectile 104 having a diameter greater than that of the launch tube 110.

The projectile 104 is shown having a generally cylindrical body, however in other implementations, projectiles 104 having any shape that is able to be moved within the launch tube 110 may be used. The body of the projectile 104 may be formed from metal, plastic, composite, concrete, or other materials. In some implementations, the projectile 104 may be formed using an additive fabrication process. In some implementations, the projectile 104 may include one or more recessions 502, such as bores, pockets, or other recessed regions or compartments, which may be used to contain sensors or other instrumentation, magnetic materials that may facilitate movement or sensing of the projectile 104, combustible or detonatable materials, propellant materials, and so forth. While FIG. 5 depicts a generally cylindrical recession 502 located within the front of the projectile 104, any number of recessions 502 having any shape may be located in any portion of the body of the projectile 104, or the projectile 104 may lack recessions 502. Additionally, while FIG. 5 depicts the body of the projectile 104 as a single piece, in other implementations, the projectile 104 may include multiple pieces that are joined together.

A front sealing member 504 may be positioned proximate to a front end of the projectile 104. In some implementations, the front sealing member 504 may include one or more O-rings, however, other types of sealing members or deformable materials may be used in other implementations. The front sealing member 504 may contact an inner diameter of the launch tube 110 as the projectile 104 moves through the launch tube 110. The front sealing member 504 may enable movement of the projectile 104 through the launch tube 110 to remove fluid, debris 108, or other materials from the launch tube 110 as the projectile 104 is accelerated through the launch tube 110. For example, the front sealing member 504 may prevent debris 108 or other material within the launch tube 110 from passing to the region of the launch tube 110 behind the projectile 104 as the projectile 104 moves through the launch tube 110. In some implementations, use of the front sealing member 504 may be omitted.

A rear sealing member 506 may be positioned proximate to a rear end of the projectile 104. The rear sealing member 506 may include one or more of the types of sealing members described with regard to the front sealing member 504. In some implementations, the front sealing member 504 and rear sealing member 506 may include the same types of sealing members, while in other implementations, the front sealing member 504 and rear sealing member 506 may include different types of sealing members. The rear sealing member 506 may contact an inner diameter of the breech tube 112 or throat 114 when the projectile 104 is seated proximate to the end of the launch tube 110. A seal between the rear sealing member 506 and the conduit within which the projectile 104 is seated may prevent the passage of propellant material(s) from the breech tube 112 and portion of the throat 114 behind the projectile toward the front of the projectile 104. As a result, the seal provided by the rear sealing member 506 may enable pressure associated with the propellant material(s) within the breech tube 112 to be increased until the pressure is sufficient to force the projectile 104 into the launch tube 110, such as by deforming, degrading, or shearing at least a portion of the rear sealing member 506 from the projectile 104.

In some implementations, the projectile 104 may include a removable portion 508 having a greater diameter than the remainder of the body of the projectile 104. For example, the removable portion 508 may have a diameter greater than that of the launch tube 110 to prevent passage of the projectile 104 into the launch tube 110 until a pressure associated with the propellant material(s) applies a force to the projectile 104 that is sufficient to cause removal (e.g., shearing or breakage) or deformation of the removable portion 508. In some implementations, the removable portion 508 may include a snap ring that may be broken or sheared as pressure from the propellant material(s) forces the projectile 104 through the throat 114 and into the launch tube 110. In other implementations, the removable portion 508 may include a portion of the body of the projectile 104 that is frangible, breakable, or deformable. In still other implementations, use of a removable portion 508 may be omitted, and the rear sealing member 506 may function to retain the projectile 104 from passing through the launch tube 110 until pressure from the propellant material(s) is sufficient to cause deformation or shearing of the rear sealing member 506. In some implementations, the projectile 104 my include a coating, such as a deformable or shearable material. The coating may form a seal between the throat 114 and the projectile 104, while also preventing passage of the projectile 104 through the throat 114 until pressure associated with the propellant material(s) applies a force sufficient to shear, break, or otherwise deform the coating. For example, use of a coating material may perform the functions of both the rear sealing member 506 and the removable portion 508, and use of a separate rear sealing member 506 and removable portion 508 may be omitted.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

Although certain steps have been described as being performed by certain devices, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   a first conduit within a borehole, wherein the first conduit has a first end oriented toward a region of geologic material;
   a first projectile within the first conduit;
   a first propellant material within the first conduit, wherein the first propellant material is configured to accelerate the first projectile from the first conduit and into contact with the region of the geologic material to generate debris having a first size, wherein the first size of the debris at least partially impedes movement of the debris using a fluid; and
   a crushing device within a second conduit within the borehole, wherein the crushing device reduces at least a portion of the debris from the first size to a second size;
   wherein the fluid is configured to move the debris having the second size through one or more of the second conduit, a third conduit within the borehole, or an annulus between a wall of the borehole and one of the first conduit, the second conduit, or the third conduit, and away from the region of geologic material.

2. The system of claim 1, further comprising a conveying device having a first end positioned in association with the crushing device and a second end positioned proximate to the region of geologic material, wherein the conveying device moves the at least a portion of the debris having the first size from a first location proximate to the second end of the conveying device through the second conduit to a second location toward the crushing device.

3. The system of claim 2, wherein the conveying device comprises an auger having one or more blades that rotationally move about a long axis of the conveying device, and wherein rotational movement of the one or more blades moves debris that contacts the one or more blades through the second conduit toward the crushing device.

4. The system of claim 3, further comprising a pre-conditioning device associated with a blade of the one or more blades, wherein rotational movement of the one or more blades changes an orientation of the pre-conditioning device relative to the region of geologic material, wherein the pre-conditioning device is configured to accelerate a pre-conditioning material into contact with at least a portion of a perimeter of at least a portion of the region of the geologic material, and wherein an interaction between the pre-conditioning material and the region of the geologic material causes the interaction between the first projectile and the geologic material to generate the debris from the at least a portion of the region within the perimeter.

5. The system of claim 1, further comprising:
   a fourth conduit that extends from an upper end of the borehole toward the first conduit for transporting one or more of: the first projectile, the first propellant material, or one or more components that are configured to generate the first propellant material.

6. The system of claim 1, wherein the first conduit is positioned within the second conduit.

7. The system of claim 1, further comprising:
   a fourth conduit extending between an upper end of the borehole and a portion of the borehole proximate to the first end of the first conduit, wherein the fourth conduit one or more of: moves a first material from the portion of the borehole toward the upper end to reduce a pressure associated with the portion of the borehole, or moves a second material toward the portion of the borehole from the upper end to increase the pressure associated with the portion of the borehole.

8. The system of claim 7, wherein the first projectile is configured to pass through the portion of the borehole to interact with the region of geologic material.

9. A system comprising:
a first conduit having a first end and a second end opposite the first end;
a first projectile;
a first propellant material, wherein the first propellant material is configured to accelerate the first projectile into contact with a region of geologic material to generate debris having a first size, wherein the first size of the debris at least partially impedes movement of the debris; and
a crushing device external to the first conduit and within a second conduit, wherein the crushing device is configured to contact the debris having the first size that enters the second conduit to form debris having a second size smaller than the first size.

10. The system of claim 9, further comprising:
a conveying device that at least partially extends within the second conduit, the conveying device having a first end positioned in association with the crushing device and a second end positioned in association with the region of geologic material, wherein the conveying device is configured to move the debris having the first size within the second conduit toward the crushing device.

11. The system of claim 9, wherein the first propellant material is moved toward the region of geologic material through one or more of:
the first conduit; or
a third conduit within one or more of the first conduit or the second conduit; and
wherein the debris having the second size is moved away from the region of geologic material through one or more of the second conduit or a fourth conduit associated with the crushing device.

12. The system of claim 9, further comprising:
a pre-conditioning device oriented to accelerate a pre-conditioning material to contact at least a portion of a perimeter of the region of the geologic material, wherein an interaction between the first projectile and the geologic material forms the debris having the first size from at least a portion of the region within the perimeter.

13. The system of claim 12, wherein the pre-conditioning device is coupled to one or more of the second conduit or the crushing device, and wherein movement of the one or more of the second conduit or the crushing device changes an orientation of the pre-conditioning device relative to the region of geologic material.

14. The system of claim 9, wherein the first conduit is within the second conduit.

15. The system of claim 9, wherein the first conduit is at least partially positioned within a borehole, the system further comprising:
a third conduit extending between an upper end of the borehole and a portion of the borehole proximate to the region of geologic material, wherein the third conduit one or more of: moves a first material from the portion of the borehole toward the upper end to reduce a pressure associated with the portion of the borehole, or moves a second material toward the portion of the borehole from the upper end to increase the pressure associated with the portion of the borehole.

16. A system comprising:
a first conduit within a borehole, the first conduit having a first end and a second end opposite the first end;
a first projectile;
a first propellant material, wherein the first propellant material is configured to accelerate the first projectile into contact with a region of geologic material to generate debris having a first size;
a crushing device configured to contact the debris having the first size to form debris having a second size smaller than the first size; and
a second conduit extending between an upper end of the borehole and a portion of the borehole proximate to the region of geologic material, wherein the second conduit one or more of: moves a first material from the portion of the borehole toward the upper end to reduce a pressure associated with the portion of the borehole, or moves a second material from the upper end toward the portion of the borehole to increase the pressure associated with the portion of the borehole.

17. The system of claim 16, wherein the first projectile passes through the portion of the borehole to contact the region of geologic material.

18. The system of claim 16, wherein the pressure associated with the portion of the borehole prevents ingress of material from the borehole into the first conduit.

19. The system of claim 16, wherein the crushing device is positioned within a third conduit external to the first conduit.

20. The system of claim 19, further comprising:
a conveying device that at least partially extends within the third conduit, wherein the conveying device has a first end positioned in association with the crushing device and a second end positioned in association with the region of geologic material, and wherein the conveying device is configured to move the debris having the first size within the second conduit toward the crushing device.

\* \* \* \* \*